United States Patent
Kaufman

(10) Patent No.: US 8,146,696 B2
(45) Date of Patent: Apr. 3, 2012

(54) METHODS AND APPARATUS FOR MOVING A VEHICLE UP OR DOWN A SLOPED SURFACE

(75) Inventor: Michael F. Kaufman, New Boston, NH (US)

(73) Assignee: Segway, Inc., Bedford, NH (US)

(*) Notice: Subject to any disclaimer, the term of this patent is extended or adjusted under 35 U.S.C. 154(b) by 673 days.

(21) Appl. No.: 12/203,019

(22) Filed: Sep. 2, 2008

(65) Prior Publication Data

US 2010/0051371 A1    Mar. 4, 2010

(51) Int. Cl.
*B60W 10/08* (2006.01)

(52) U.S. Cl. .................. 180/170; 180/65.285

(58) Field of Classification Search ............ 180/65.265, 180/65.285
See application file for complete search history.

(56) References Cited

U.S. PATENT DOCUMENTS

| 6,302,230 | B1 | 10/2001 | Kamen et al. ............. 180/171 |
| 6,311,794 | B1 | 11/2001 | Morrell et al. ............ 180/8.3 |
| 6,343,664 | B2 | 2/2002 | Morrell et al. ............ 180/8.2 |
| 6,415,879 | B2 | 7/2002 | Kamen et al. ............. 180/8.2 |
| 6,698,541 | B2 * | 3/2004 | Sakakiyama ............. 180/233 |
| 6,701,224 | B1 * | 3/2004 | Klusemann ............... 701/1 |
| 6,755,489 | B2 * | 6/2004 | Kuno et al. ............. 303/191 |
| 6,779,621 | B2 | 8/2004 | Kamen et al. ............ 180/282 |
| 6,799,649 | B2 | 10/2004 | Kamen et al. ............. 180/8.2 |
| 6,874,591 | B2 | 4/2005 | Morrell et al. ........... 180/179 |
| 7,695,401 | B2 * | 4/2010 | Soliman et al. ............ 477/5 |
| 7,826,940 | B2 * | 11/2010 | Miranda et al. ............ 701/22 |
| 7,877,178 | B2 * | 1/2011 | Lu et al. ................ 701/36 |
| 2004/0011573 | A1 | 1/2004 | Kamen et al. ............ 180/7.1 |
| 2006/0108156 | A1 | 5/2006 | Heinzmann et al. ........ 180/8.2 |

FOREIGN PATENT DOCUMENTS

WO    2008/022067    2/2008

* cited by examiner

*Primary Examiner* — Jeffrey J Restifo
(74) *Attorney, Agent, or Firm* — Pierce Atwood LLP

(57) ABSTRACT

A system and method for safely moving a vehicle up or down a sloped surface is provided. In one embodiment, a method involves operating the vehicle in a sloped surface mode when at least one ground contacting element for moving the vehicle is on the sloped surface. An amount of torque is provided to the at least one ground contacting element to prevent the vehicle from uncontrollably moving down the sloped surface while in the sloped surface mode of operation. An assist mechanism can be coupled to the propulsion system to enable an operator to guide the vehicle.

7 Claims, 6 Drawing Sheets

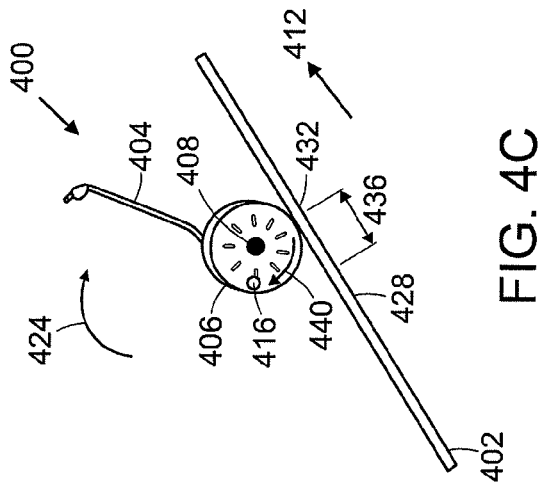
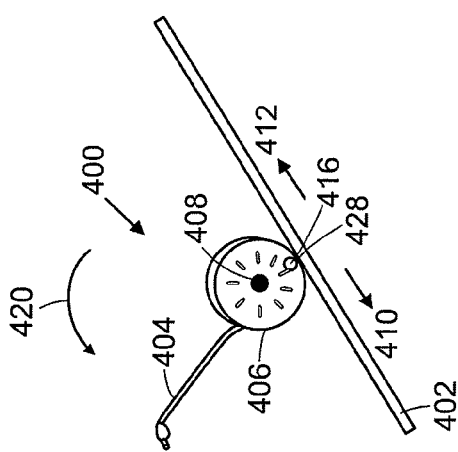
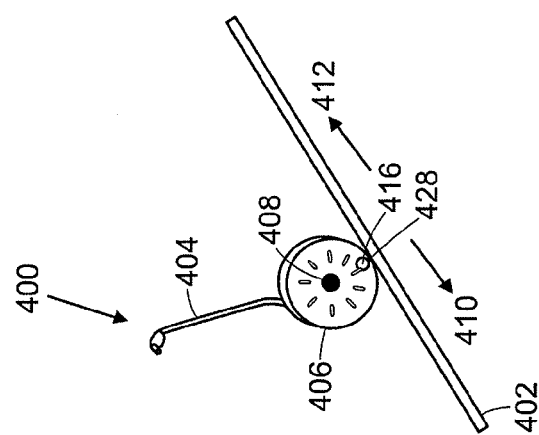

METHODS AND APPARATUS FOR MOVING A VEHICLE UP OR DOWN A SLOPED SURFACE

FIELD OF THE INVENTION

The present invention pertains to control of electric vehicles, and in particular, controlling electric vehicle motion on a sloped surface.

BACKGROUND OF THE INVENTION

A wide range of vehicles or transporters and methods are known for transporting human subjects. Typically, such transporters rely upon static stability and are designed for stability under all foreseen conditions of placement of their ground-contacting elements or members with an underlying surface. For example, a gravity vector acting on the center of gravity of an automobile passes between the points of ground contact of the automobile's wheels and the suspension of the automobile keeps all wheels on the ground at all times making the automobile stable. Although, there are conditions (e.g., increase in speed and sharp turns) which cause otherwise stable transporters to become unstable.

A dynamically stabilized transporter, also known as a balancing transporter, is a type of transporter that has a control system that actively maintains the stability of the transporter while the transporter is operating. The control system maintains the stability of the transporter by continuously sensing the orientation of the transporter, determining the corrective action necessary to maintain stability, and commanding the wheel motors to make the corrective action. If the transporter loses the ability to maintain stability, such as through the failure of a component or a lack of sufficient power, the rider may experience a sudden loss of balance.

For vehicles that maintain a stable footprint, coupling between steering control and control of the forward motion of the vehicles is not an issue of concern. Under typical road conditions, stability is maintained by virtue of the wheels being in contact with the ground throughout the course of a turn. In a balancing transporter, however, any torque applied to one or more wheels affects the stability of the transporter. Coupling between steering and balancing control mechanisms is one subject of U.S. Pat. No. 6,789,640, which is incorporated herein by reference.

SUMMARY OF THE INVENTION

The invention, in one aspect, features a system for safely moving a vehicle up or down a sloped surface while in a sloped surface mode of operation. The system includes at least one ground contacting element for moving the vehicle on the sloped surface. The system also includes a propulsion system providing an amount of torque to the at least one ground contacting element to prevent the vehicle from uncontrollably moving down the sloped surface while in the sloped surface mode of operation. The system also includes an assist mechanism coupled to the propulsion system to enable an operator to guide the vehicle.

In some embodiments, the propulsion system includes a motor drive coupled to the at least one ground contacting element and a motor controller coupled to the motor drive for monitoring a shaft speed of the motor drive and adjusting the amount of torque provided to the at least one ground contacting element to prevent the vehicle from uncontrollably moving down the sloped surface.

In some embodiments, the system includes a controller coupled to the propulsion system for controlling the direction of torque provided to the at least one ground contacting element. In some embodiments, the controller is operable in a first sloped surface mode of operation for increasing the amount of torque provided to the at least one ground contacting element to allow the vehicle to move up the sloped surface and a second sloped surface mode of operation for decreasing the amount of torque provided to the at least one ground contacting element to allow the vehicle to move safely down the sloped surface.

In some embodiments, movement of the assist mechanism from a first position to a second position causes the vehicle to move up the sloped surface in the first sloped surface mode operation and movement of the assist mechanism from the first position to the second position causes the vehicle to move down the sloped surface in the second sloped surface mode of operation. In some embodiments, movement of the assist mechanism simulates a ratchet-type movement between the assist mechanism of the vehicle and a location that the ground contacting element contacts the sloped surface. In some embodiments, the controller is wirelessly coupled to the propulsion system.

In some embodiments, the system includes a distance module for limiting the distance the vehicle travels. In some embodiments, the vehicle is a balancing transporter, a push-cart dolly, or a pull cart dolly.

In some embodiments, wherein at least one of pitch rate or pitch of the vehicle controls forward movement of the vehicle. In some embodiments, the assist mechanism enables the operator to steer the vehicle. In some embodiments, at least one ground contacting element is a wheel.

The invention, in another aspect, features a method for safely moving a vehicle up or down a sloped surface. The methods involves providing a sloped surface mode of operation and providing an amount of torque to at least one ground contacting element of the vehicle to prevent the vehicle from uncontrollably moving down the sloped surface while in the sloped surface mode of operation. The method also involves providing an assist mechanism to enable an operator to guide the vehicle.

In some embodiments, the method involves monitoring a shaft speed of a motor drive of the vehicle and adjusting the amount of torque provided by the motor drive to the at least one ground contacting element to prevent the vehicle from uncontrollably moving down the sloped surface. In some embodiments, the method involves controlling the direction of torque provided to the at least one ground contacting element.

In some embodiments, the method involves increasing the amount of torque provided to the at least one ground contacting element to allow the vehicle to move up the sloped surface in a first sloped surface mode of operation. In some embodiments, the method involves moving the assist mechanism from a first position to a second position of the vehicle to initiate the first sloped surface mode of operation. In some embodiments, the movement of the assist mechanism simulates a ratchet-type movement between the assist mechanism of the vehicle and a location that the ground contacting element contacts the sloped surface (e.g., ground).

In some embodiments, the method involves decreasing the amount of torque provided to the at least one ground contacting element to allow the vehicle to move safely down the sloped surface in a second mode of operation. In some embodiments, the method involves initiating the second mode of operation by a non-movement of the assist mechanism of the vehicle.

In some embodiments, the method involves limiting the distance the vehicle travels while in the mode of operation. In some embodiments, the method involves controlling forward movement of the vehicle via a pitch of the vehicle.

In some embodiments, the method involves steering the vehicle via the assist mechanism of the vehicle.

The invention, in another aspect, includes a computer program product, tangibly embodied in a computer or a removable storage device. The computer program product including instructions being operable to cause a data processing apparatus to monitor a shaft speed of a motor drive of a vehicle and adjust the amount of torque provided by the motor drive to at least one ground contacting element of the vehicle to prevent the vehicle from uncontrollably moving down a sloped surface.

The invention, in another aspect, includes a system for safely moving a vehicle up or down a sloped surface. The system includes means for providing a sloped surface mode of operation and means for providing an amount of torque to at least one ground contacting element of the vehicle to prevent the vehicle from uncontrollably moving down the sloped surface while in the sloped surface mode of operation.

BRIEF DESCRIPTION OF THE DRAWINGS

The foregoing features of the invention will be more readily understood by reference to the following detailed description, taken with reference to the accompanying drawings, in which:

FIG. 4A is a schematic illustration of a transporter with a neutral position in a sloped surface mode of operation, according to an illustrative embodiment of the invention.

FIG. 4B is a schematic illustration of a transporter with a downward pump position in a sloped surface mode of operation, according to an illustrative embodiment of the invention.

FIG. 4C is a schematic illustration of a transporter with an upward pump position in a sloped surface mode of operation, according to an illustrative embodiment of the invention.

DETAILED DESCRIPTION OF ILLUSTRATIVE EMBODIMENTS

Embodiments of the present invention are useful in all vehicles and, in particular, vehicles that utilize electric motors and drives as the sole or primary means of applying force/torque to the vehicle wheels for both acceleration and deceleration. Such vehicles typically are motoring or consuming energy when operating to drive forward. Sometimes the vehicle may need to move along a sloped surface without an operator driving it forward, for example, when moving the vehicle up a ramp to load it into a truck's flatbed or down a ramp to remove it from a truck's flatbed. Embodiments of the present invention are useful with statically stable vehicles and dynamically stabilized vehicles (e.g., dynamically stabilized balancing transporters).

A transporter may be said to act as 'balancing' if it is capable of operation on one or more wheels but would be unable to stand on the wheels but for operation of a control loop governing operation of the wheels. A balancing transporter lacks static stability but is dynamically balanced. A transporter may advantageously be used as a mobile work platform or a recreational vehicle such as a golf cart, or as a delivery vehicle. In some embodiments, a transporter is advantageously used as a push or pull cart of dolly. The wheels, or other ground-contacting elements, that provide contact between such a transporter and the ground or other underlying surface, and minimally support the transporter with respect to tipping during routine operation, are referred to herein as 'ground-contacting elements.'

In some embodiments, balancing transporters have several modes of operation, for example, a normal riding balance mode, a rider-less balance mode in which an operator leads or commands transporter motion while not riding the transporter, a manual pushing mode in which the operator pushes or pulls the transporter to move it, an off mode and/or a sloped surface mode in which an operator controls the transporter to ascend or descend a sloped surface. The sloped surface mode can be used to move the vehicle along a sloped surface without a rider mounted on the vehicle. When moving the transporter along a sloped surface, the transporter can provide torque to assist an operator in moving the transporter along the sloped surface, while minimizing the chance that the transporter moves in an uncontrolled manner without an operator command.

Figure 1:
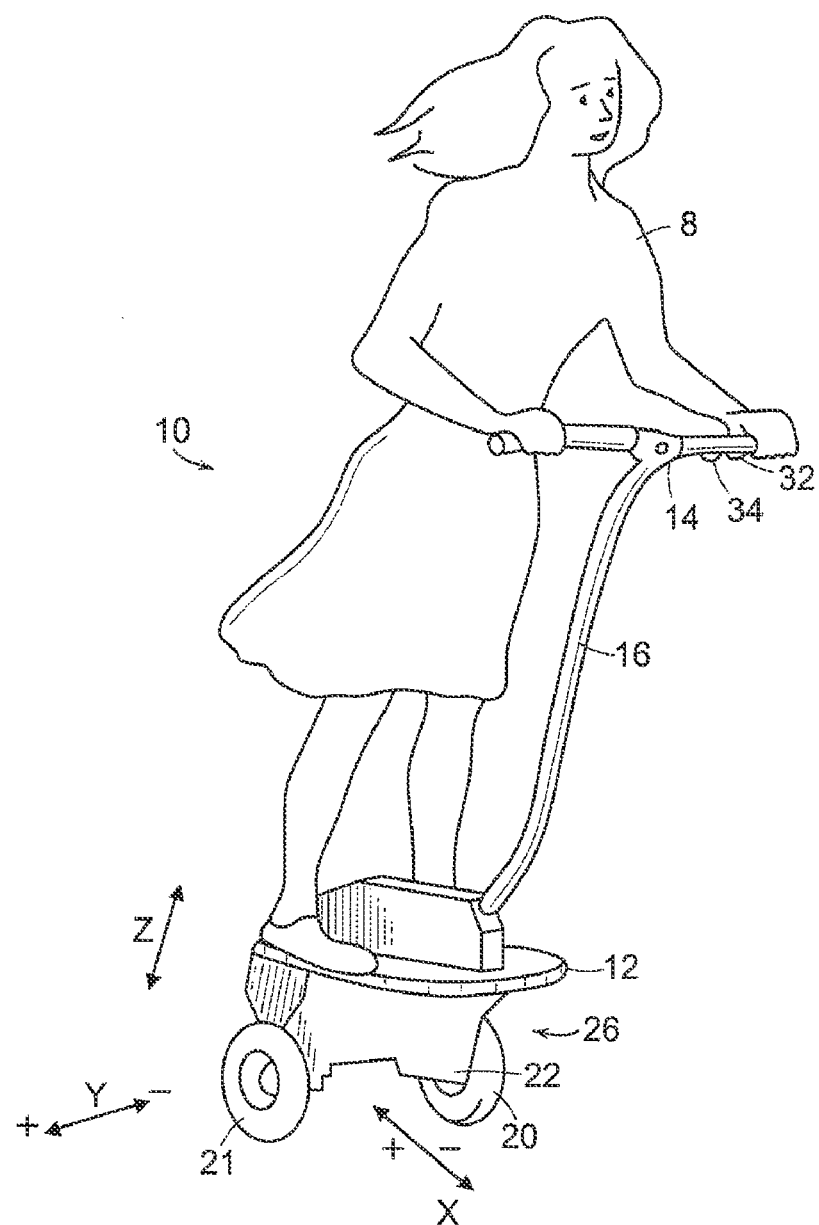
FIG. 1 is a schematic illustration of a transporter, as described in detail in U.S. Pat. No. 6,302,230, to which the present invention may advantageously be applied.

FIG. 1 shows a balancing personal transporter, designated generally by numeral 10 as an example of a device to which the present invention may advantageously be applied. Principles of the present invention may also be advantageously applied to alternative transporters (e.g., the transporters described in detail in U.S. Pat. No. 6,302,230, the entire contents of which is incorporated herein by reference). An operator 8 stands on a support platform 12 of ground-contacting module 26 and holds a grip 14 on a handle 16 attached to the platform 12. Wheels 21 and 22 are coaxial about the Y axis. A control loop is provided so that leaning of the operator results in the application of torque to wheel 20 about axle 22 by means of a propulsion system (e.g., a motor drive located in, or as part of, the ground-contacting module).

The operator 8 steers the transporter by pushing the handle 16 to the operator's left and right (along the negative and positive direction, respectively, along the Y-axis). In some embodiments, steering or control of the transporter 10 is performed by an operator 8 causing the handle 16 of the transporter 10 to lean (e.g., change in angle) with respect to one or more axes (X, Y and Z) of the transporter 10. In some embodiments, steering or other control is provided by thumbwheels 32 and 34, a twist-grip mechanism in the grip 14, or by other operator input mechanisms.

Transporter 10, however, is statically unstable, and, absent operation of the control loop to maintain dynamic stability, transporter 10 will no longer be able to operate in its typical operating orientation. "Stability" as used herein, refers to the mechanical condition of an operating position with respect to which the system will naturally return if the system is perturbed away from the operating position in any respect.

The transporter 10 may be operated in a station-keeping mode, wherein balance is maintained substantially at a specified position. Additionally, the transporter 10, which may be referred to herein, without limitation, as a "vehicle," may also maintain a fixed position and orientation when the operator 8 is not on the platform 12. This mode of operation prevents runaway of the transporter 10 and provides for the safety of the operator and other persons. In one embodiment, the transporter 10 is operated in the station-keeping mode while the operator is stepping on to, or off of, the platform 12 of the transporter 10. In some embodiments, a force plate or other sensor (not shown) disposed on the platform 12 is used to detect the presence of an operator on the transporter 10.

Figure 2:
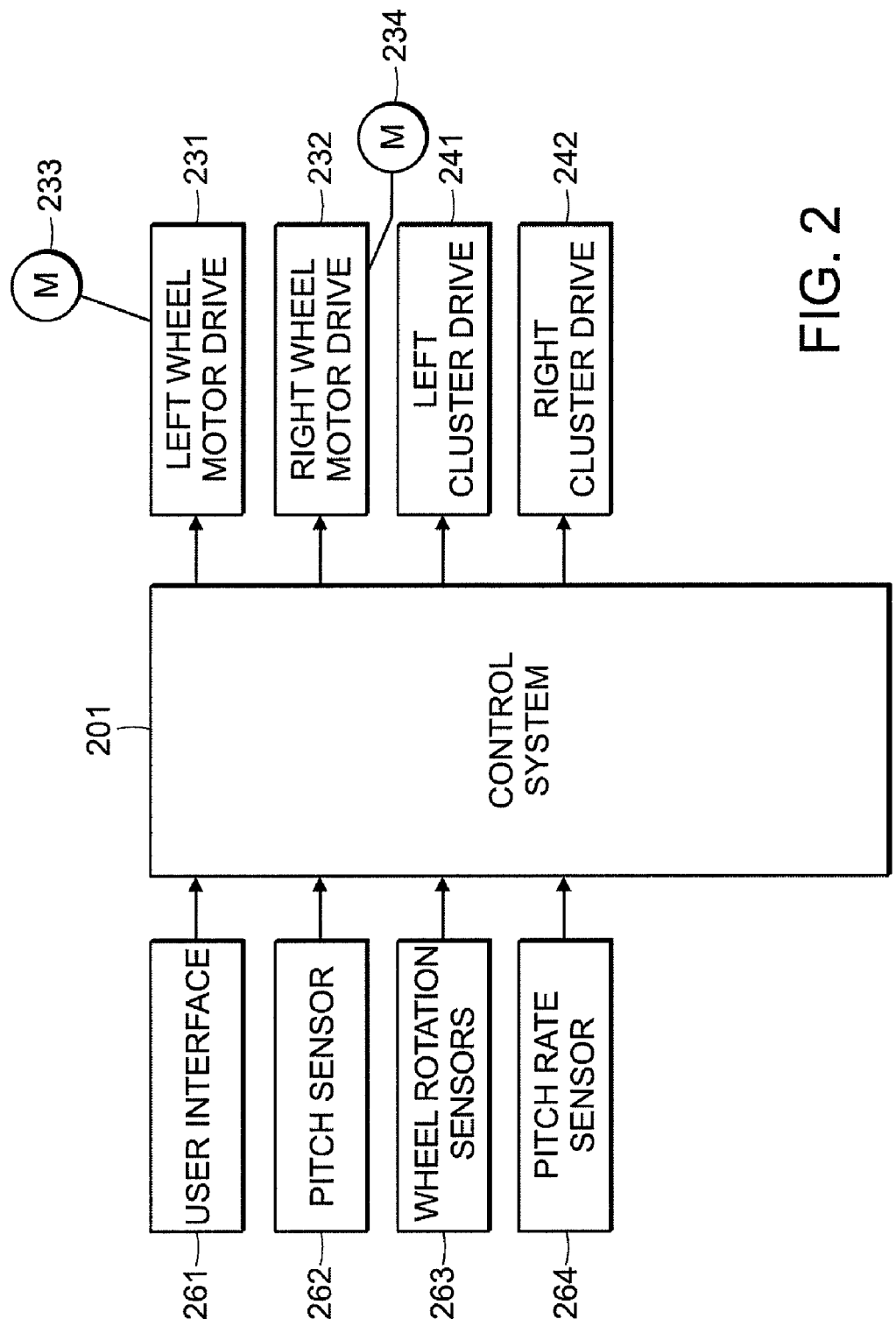
FIG. 2 is a block diagram showing sensors, power and control for a transporter, according to an illustrative embodiment of the invention.

The block diagram of FIG. 2 shows a control system 201 for controlling a vehicle, according to an illustrative embodiment of the invention. In this embodiment of the invention, the control system 201 is used to control a propulsion system (e.g., motors, motor drives, actuators or engines) of a vehicle. The control system 201 can be applied to, for example, the balancing transporter 10 of FIG. 1. Motor drives 231 and 232 control the left and right wheels of the transporter 10, respectively. The control system 201 has data inputs including user interface 261, pitch sensor 262 for sensing fore-aft pitch of the vehicle, wheel rotation sensors 263, and pitch rate sensor 264. Pitch rate and pitch may be derived through the use of various sensors (e.g., gyroscopes or inclinometers), alone or in combination. Control system 201 also may contain a balancing margin monitor (not shown) which combines information on current battery parameters with information on motor parameters to calculate a maximum current speed that can be maintained by the transporter. The balancing margin monitor is used to ensure, for example, that sufficient battery current is available when transients (e.g., bumps) are experienced during use of the vehicle to maintain stability of the vehicle. If cluster wheels are present (as with respect to, for example, FIG. 2 of U.S. Pat. No. 6,874,591, the entire contents of which are incorporated by reference), left cluster drive 241 and right cluster drive 242 are used to drive the left and right clusters, respectively.

A ground-contacting member typically has a "point" (actually, a region) of contact or tangency with the surface over which a vehicle (e.g., transporter) is traveling or standing. Due to the compliance of the ground-contacting member, the "point" of contact is actually an area, where the region of contact may also be referred to as a contact patch. For example, the weight of a transporter is distributed over the contact region, giving rise to a distribution of pressures over the region, with the center of pressure displaced forward during forward motion. The distribution of pressures is a function both of the composition and structure of the wheel, the rotational velocity of the wheel, the torque applied to the wheel, and thus of the frictional forces acting on the wheel.

Figure 3:
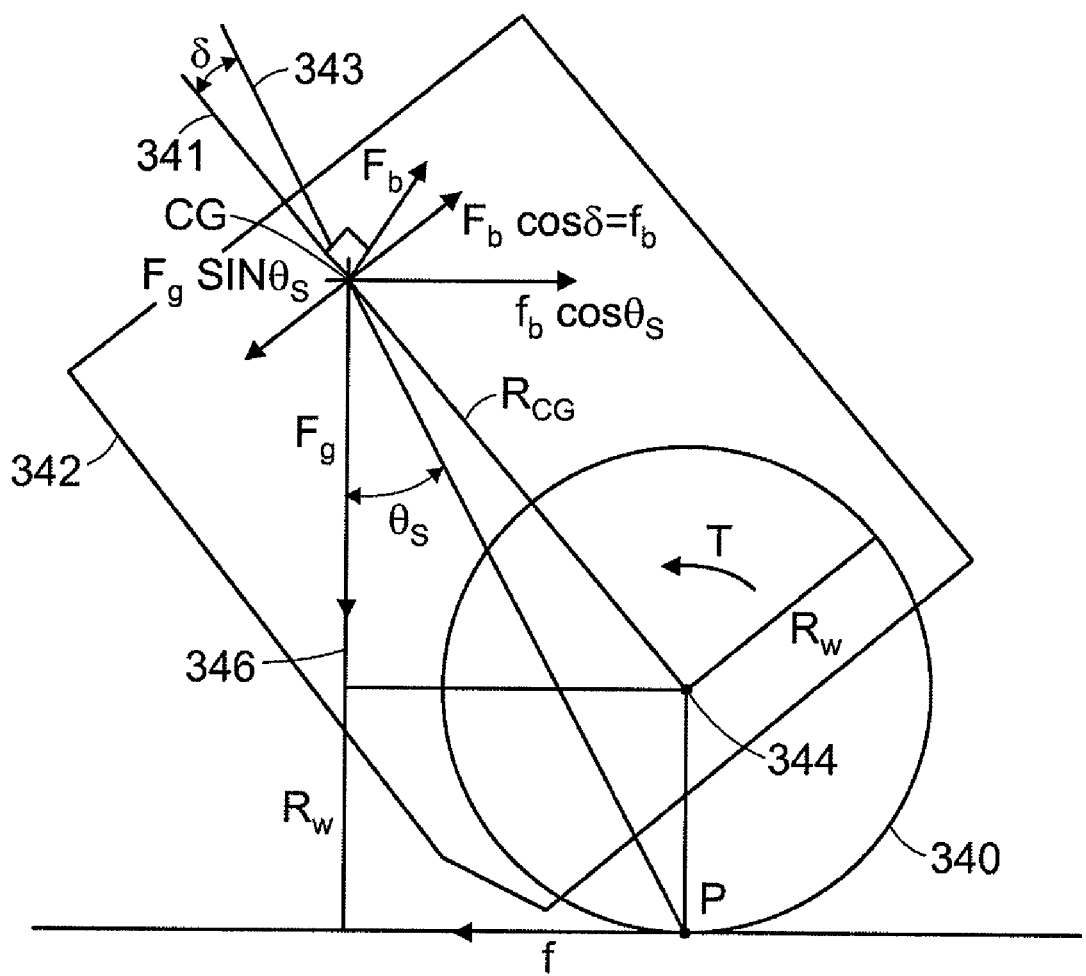
FIG. 3 is an illustrative diagram of an idealized balancing transporter with wheel in motion at a constant velocity across a flat surface.

A force in the direction of motion is required to overcome rolling friction (and other frictional forces, including air resistance). In some embodiments of the invention, if the vehicle is on a sloped surface, gravity provides a torque about the point of contact with the surface to propel the vehicle in the direction of the desired motion. FIG. 3 shows the forces acting on a single wheel that travels with constant velocity v over a flat surface. The principles now discussed may readily be generalized to operation on a sloped surface and to accommodate any other external forces that might be present. Wheel 340 of radius $R_w$ rotates with respect to chassis 342 about axle 344 and contacts the underlying surface at point P. For illustrative purpose only, it is assumed that wheel 340 contacts the surface at a point.

The wheel is driven with respect to the transporter by a torque T (supplied by, for example, a motor) which in turn creates a reaction torque −T on the transporter. Since the torque acts about the axle 344, the reaction torque corresponds to a force $F_b$ acting at the center of gravity (CG) of the system, including the transporter and payload, where $F_b = T/R_{CG}$, where $R_{CG}$ is the distance between the axle and the CG of the system. The line 343 from the CG to point P is at an angle $\theta_s$ relative to the vertical 346.

The rolling friction, f, acting on the wheel at point P, is proportional to the velocity v of the rim of the wheel, with the proportionality expressed as $f = \mu v$. For constant velocity to be maintained, this force f must be exactly canceled. Consequently, with gravity providing the force, the condition that must be satisfied is:

$$F_b \cos \theta_s = f_b \quad \text{(EQN. 1),}$$

where $f_b$ is the component of the reaction force acting transverse to axis 141 between the CG and point P. In order to maintain stability (e.g., prevent a transporter from falling), a stability condition must also exist, namely that no net force acts on the CG in a direction transverse to line 343. There must be no net torque about the point of contact P during motion at constant velocity (i.e., in an inertial frame of reference where the point P is fixed). This condition may be expressed as:

$$F_g \sin \theta_s = f_b \quad \text{(EQN. 2),}$$

where $F_g \sin \theta_s$ is the "tipping" component of gravity, and $f_b$ is the counter-tipping component of the reactive force on a vehicle (e.g., transporter) caused by wheel rotation ($f_b = F_b \cos \delta$), and where δ is the angle shown between line 343 and line 341.

Equations 1 and 2 may be combined to yield $F_g \sin \theta_g \cos \theta_s = f = \mu v$, thus, in the limit of small angles (where $\sin \theta$ is approximately θ), $$\theta_s = \left(\frac{\mu}{F_g}\right) v, \quad \text{(EQN. 3)}$$

showing that for a transporter, increasing velocity requires increased lean to overcome the effects of friction. Additionally, a control loop that imposes stability on the system will respond to an increased lean by increasing velocity of the system. Additional lean beyond that required to overcome the effects of friction will result in acceleration since an additional forward-directed force acts on the CG of the vehicle. Conversely, in order to achieve acceleration (or deceleration) of the transporter, additional leaning (forward or backward) must be provided.

FIGS. 4A, 4B and 4C illustrate control of a transporter 400 along a sloped surface, according to an illustrative embodiment of the invention. The transporter 400 (e.g., transporter 10 of FIG. 1) can have several modes of operation. For example, operating modes of the transporter 400 can include modes where an operator is supported by the transporter 400 and/or modes where the operator is not supported by the transporter 400. The operator can guide the transporter 400 in any one of multiple ways. For example, the operator can lead the transporter 400 while walking alongside it, push the transporter 400 while walking behind it, or pull the transporter 400 while walking in front of it. The transporter 400 can include a riding balance mode, a rider-less balance mode in which the operator commands transporter motion while not riding the transporter 400, a manual mode in which the operator guides the transporter 400 to move it, an off mode, and/or a sloped surface mode in which the operator controls the transporter 400 to ascend or descend a sloped surface 402.

In some embodiments, the transporter is configured to prevent an operator from switching between certain operating modes. For example, when an operator is operating the transporter in the sloped surface mode, the transporter may be configured to prohibit the user from switching directly into the riding balancing mode. Instead, the operator can be required to switch into the off mode before being able to switch into the riding balancing mode. Limiting mode switching under certain conditions can be desired, for example, to provide additional safety against unwanted motion of the transporter 400.

In the riding balance mode, the operator mounts the transporter 400 and commands acceleration, deceleration and orientation of the transporter 400 while the transporter 400 maintains stability (e.g., prevents the transporter 400 from falling). In the rider-less balance mode the operator does not mount the transporter 400. The operator guides (e.g., pushes or pulls) the transporter 400 while the transporter 400 maintains stability. In the manual mode and in the off mode, the operator does not mount the transporter 400. The operator guides the transporter 400 and maintains stability. In the sloped surface mode, the transporter 400 is on a sloped surface 402. The operator does not mount the transporter 400. The operator manually grips an assist mechanism (specifically handle 404 in this embodiment) of the transporter and pumps it to move the transporter 400 along the sloped surface 402. The pumping motion or movement of the assist mechanism simulates a ratchet-type movement between the assist mechanism of the transporter 400 and a portion of the ground contacting element 406 of a propulsion system of the transporter 400 that contacts the ground.

FIG. 4A is a schematic illustration of the transporter 400 in a neutral position in a sloped surface mode. The transporter 400 includes a handle 404, and two contacting elements 406 (one of which is adjacent to but obscured by the visible ground contacting element in the foreground of the figure). The transporter 400 also includes a propulsion system (not shown) coupled to the contacting elements 406. The propulsion system provides torque to the ground contacting element 406, for example, as described with respect to FIGS. 1 and 2. Location 416 on the ground contacting elements 406 is initially located in contact with the sloped surface 404 beneath the ground contacting elements 406 at location 428 on the sloped surface 402. In the neutral position the handle 404 of the transporter 400 is positioned to command the transporter's speed to be zero, thus preventing the transporter 400 from uncontrollably moving (e.g., sliding) down the sloped surface 402 along the direction of arrow 410.

In some embodiments, the propulsion system includes a motor drive (e.g., motor drives 231 and 232) coupled to the ground contacting elements 406. The propulsion system also includes a motor controller (control system 201) coupled to the motor drives for monitoring shaft speed of the motor drives and adjusting the amount of torque provided to the ground contacting elements 406 to prevent the vehicle from uncontrollably moving down the sloped surface.

In some embodiments, the transporter 400 has alternative numbers and types of ground contacting elements for supporting the transporter 400 and for moving the transporter 400 along an underlying surface. In some embodiments, the transporter 400 has one or multiple ground contacting elements. In some embodiments, the ground contacting elements are one or more, for example, wheels, treads, tracks, rollers.

FIG. 4B is a schematic illustration of the transporter 400 with a downward pump position in the sloped surface mode. A downward pump occurs when the handle 404 is rotated counter clockwise (420) from the neutral position (shown in FIG. 4A) into the downward pump position. In the downward pump position the ground contacting elements 406 remain stationary while a platform (not shown) that is part of the transporter 400 and the handle 404 are rotated in a counter clockwise direction about an axis 408 of the ground contacting elements 406. Location 416 on the ground contacting elements 406 is still generally located in contact with the sloped surface 402 beneath the ground contacting elements 406 at location 428 on the sloped surface 402. The rotation from the neutral position (depicted in FIG. 4A) to the downward pump position (depicted in FIG. 4B) results in a change of the pitch of the transporter 400.

As discussed above in connection with FIG. 2, in a normal balance mode, the transporter can accelerate and/or decelerate based on a change of pitch and/or pitch rate of the transporter 400. In sloped surface mode, a change of pitch and/or pitch rate of the transporter that results from the downward pump does not cause acceleration or deceleration of the transporter 400. Instead, in the sloped surface mode, the transporter 400 remains stationary and is prevented from sliding down the sloped surface 402. The downward pump position of the handle 404 determines the starting position for the upward pump. In some embodiments, during a downward pump, the desired motor torques are determined to exactly cancel the transporter's 400 pitch rate, in addition to keeping the transporter 400 from sliding down the slope FIG. 4C is a schematic illustration of the transporter 400 with an upward pump position in the sloped surface mode. The upward pump occurs when the handle 404 is rotated in a clockwise direction (424) from the downward pump position (shown in FIG. 4B) into the upward pump position. In the upward pump position the ground contacting elements 406, the platform (not shown) that is part of the transporter 400 and handle 404 are rotated in a clockwise direction (424) together. In the sloped surface mode during an upward pump the propulsion system (e.g., motors) coupled to the ground contacting elements 406 apply torque to the ground contacting elements 406 to propel the transporter 400 up the sloped surface 402 along the direction of arrow 412. The ground contacting elements 406 are no longer in contact with the sloped surface 402 at location 428, rather the ground contacting elements 406 are in contact with the sloped surface 402 at location 432. Location 416 on the ground contacting elements 406 moves due to the torque applied to the ground contacting elements 406. The arc 440 transcribed by the motion of location 416 as the ground contacting elements 406 move is proportional to the distance 436 the transporter 400 travels along the direction of arrow 412 on the sloped surface 402.

Rate of change of pitch of the transporter 400 is the difference between the pitch of the transporter in the downward pump position and the pitch of the transporter 400 in the upward pump position versus time. In this embodiment, the speed of the transporter 400 as it moves along the sloped surface 402 is proportional to the rate of change of pitch.

The speed of the transporter 400 as it moves along the sloped surface 402 can be greater or less than the rate of change of the pitch. For example, the operator operating the transporter 400 can configure the control electronics (e.g., control system 201 of FIG. 2) of the transporter 400 so the speed of the transporter 400 as it moves along the sloped surface is half the rate of change of the pitch that is created by the operator's movement of the handle 404. A maximum rate of change in pitch can be set in the control electronics that sets a maximum speed the transporter 400 can travel along the sloped surface 402. By limiting the maximum allowable rate of change or pitch and/or the maximum speed the transporter 400 can travel along the sloped surface 402, the operator can limit the maximum distance 436 that the transporter 400 can travel as a result of the operator performing a downward pump (rotating counter clockwise 420) and then an upward pump (rotating clockwise 424) while operating in the sloped surface mode. The operator can command the transporter 400 to travel further along the direction 412 by performing additional downward pump/upward pump cycles. In some embodiments, a transporter 400 includes a distance module for limiting the distance the transporter 400 travels. In some embodiments, the distance module is included in a controller used to control operation of the transporter (e.g., control system 201 of FIG. 2).

In some embodiments, the sloped surface mode of the transporter 400 is configured to allow the operator to guide the transporter down the sloped surface 402. In this embodiment, the pumping action described with respect to FIGS. 4A, 4B and 4C allows the operator to guide the transporter 400 down the sloped surface 402 in a controllable (not uncontrollable) manner. In the neutral position and the downward pump position, the propulsion system provides torque to the ground contacting elements 406 to keep the transporter 400 from uncontrollably moving down the sloped surface 402. The upward pump (described with respect to FIG. 4C) occurs when the handle 404 is rotated in a clockwise direction (424) from the downward pump position (shown in FIG. 4B) into the upward pump position. During the upward pump the propulsion system (e.g., motors) coupled to the ground contacting elements 406 apply an amount of torque necessary to allow the ground contacting elements 406 to move the transporter 400 down the sloped surface 402. In this embodiment, the propulsion system decreases the torque (relative to the amount provided in the neutral position and downward pump position) provided to the ground contacting element 406, thereby causing the vehicle to travel down the sloped surface 402.

In some embodiments of the invention, the transporter 400 and its associated propulsion systems and controllers are configured to move the transporter up and/or down a sloped surface while in one or more different sloped surface modes of operation. In some embodiments, the sloped surface mode of operation may be applied to transporters that are operating on level surfaces. For example, the ratchet-type movement of an assist mechanism of a transporter may be used to control motion of the transporter, such that the neutral position and downward pump motion do not allow the vehicle to move, but, the upward pump motion causes the vehicle to move forward.

In some embodiments, the transporter is advantageously used as a push or pull cart of dolly. A platform (e.g., platform 12 of FIG. 1) of the transporter is used to support packages or some other form of load. Principles of the present invention are applied to the transporter to safely move the transporter up or down a sloped surface while operating in one or more sloped surface modes of operation. In this manner, the operator of the transporter does not need to support the weight of the load of the vehicle otherwise involved in moving the load up or down the surface.

The principles of the invention described in FIGS. 4A, 4B and 4C can be applied to various vehicles with various propulsion system. In one embodiment, principles of the invention are applied to a vehicle that has a propulsion system comprising motors that are coupled to wheels. The propulsion system provides torque to the wheels. An assist mechanism coupled to the vehicle is used to control the propulsion system. The assist mechanism can be, for example, the handle 404 of FIGS. 4A, 4B and 4C. In some embodiments, the propulsion system provides an amount of torque to the wheels to prevent the vehicle from sliding down the sloped surface in the sloped surface mode (e.g., for the neutral positioned or downward pumped positioned handle 404, as described above in FIGS. 4A, 4B and 4C).

In one embodiment, after the vehicle has travelled a pre-specified maximum distance in the sloped surface mode, the operator must re-enable the sloped surface mode before the vehicle will move in response to the downward-upward pump cycle again to ensure the operator truly intends the vehicle to continue to operate in the sloped surface mode. In one embodiment, the sloped surface mode can be re-enabled by a button depressed by the operator on a controller (e.g., wired device or wireless remote device) used to control the vehicle. The controller can be coupled to the propulsion system of the vehicle to, for example, engage or disengage from various modes of operation of the vehicle.

In some embodiments, pitch rate and/or pitch are derived through the use of various sensors (e.g., gyroscopes or inclinometers), alone or in combination. In some embodiments, the various sensors are the same sensors that are used to derive pitch rate and/or pitch while operating in normal balance mode.

Referring to FIGS. 4A, 4B and 4C, in some embodiments, the amount of torque provided to the ground contacting elements 408 is a function of the position of the handle 404. For example, if the handle 404 is in the neutral position then the torque provided to the ground contacting element 408 is sufficient to prevent the transporter 400 from rolling down the sloped surface 402. Another example, the torque applied to the ground contacting elements 408 while the handle 404 is rotated from the downward pump position to the upward pump position can be sufficient to cause the transporter 400 to travel a distance proportional to the handle's upward pump position relative to a downward pump position. In some embodiments, the amount of torque provided to the ground contacting elements 408 is a function of the pitch and/or pitch rate of a transporter 400. In another embodiment, the amount of torque provided to the ground contacting elements 408 is set based on an input from a wireless remote device operated by the operator.

In some embodiments, a controller (e.g., the control system 201 of FIG. 2) is coupled to the propulsion system for controlling the direction and amount of torque provided to the ground contacting elements 408. In some embodiments, the propulsion system can include a motor controller and at least one motor drive coupled to the ground contacting elements 408. The motor controller can monitor a motor shaft speed of the motor drive and adjust an amount of torque provided to the ground contacting elements 408 by the motor drive.

In one embodiment, when the transporter 400 is on a sloped surface in the sloped surface mode, an operator's command to switch from the sloped surface mode is ignored to prevent the transporter 400 from sliding down the sloped surface 402. The switch can be ignored if, for example, in the balancing mode the maximum allowable torque is below the amount of torque required to prevent the transporter 400 from sliding down the sloped surface 402. The maximum allowable torque in the balance mode can be below the amount of torque needed to prevent the transporter 400 from sliding down the sloped surface 402 if, for example, the balance mode is set for an inexperienced rider.

Figure 5:
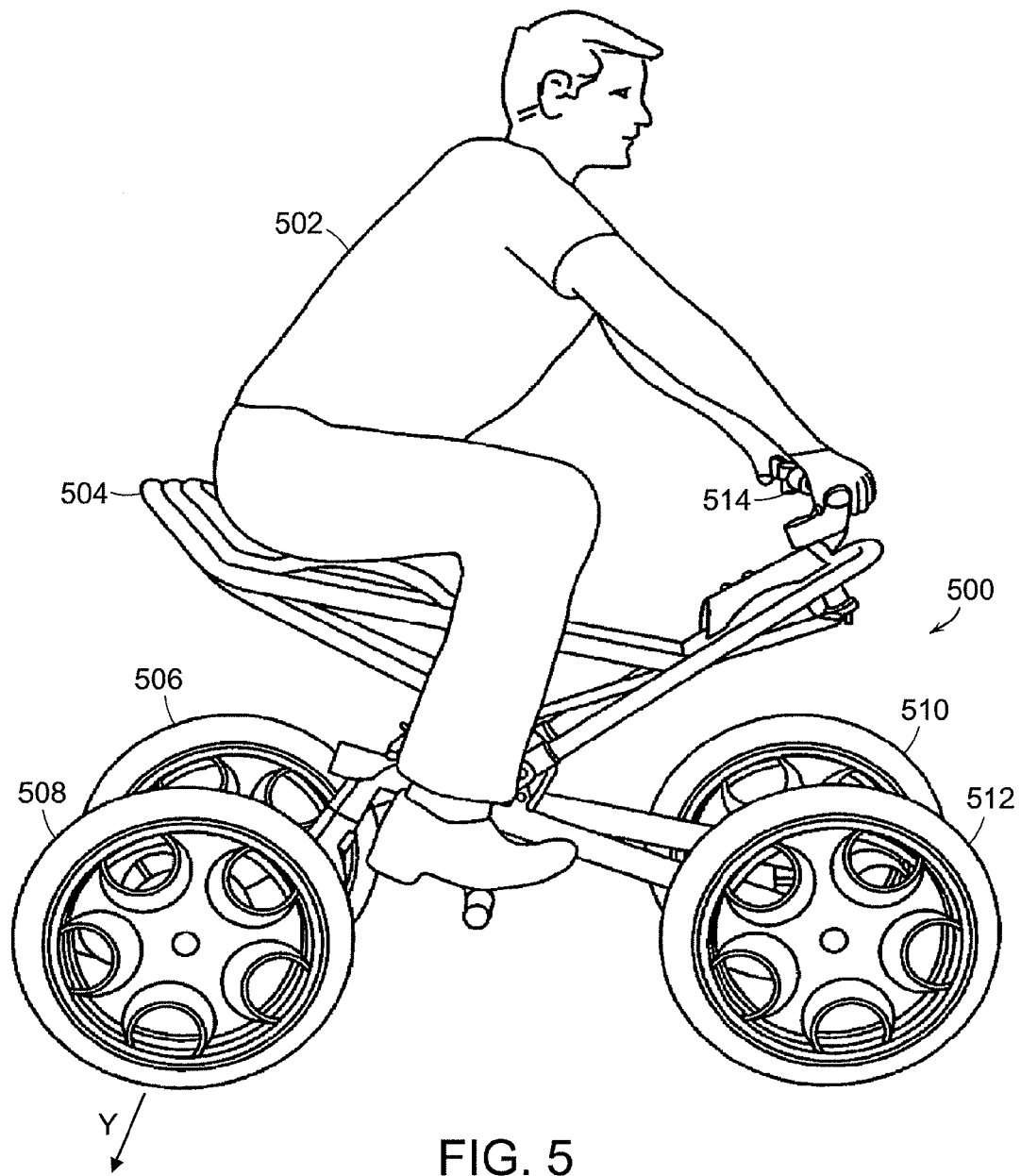
FIG. 5 is a perspective, side view of a four wheeled vehicle showing operation by a seated user, according to an illustrative embodiment of the invention.

Different numbers of wheels or other ground-contacting elements may be used in various embodiments of the invention as particularly suited to varying applications. U.S. Patent Publication No. 2006/0108156, incorporated herein by reference, describes a four wheeled vehicle in FIG. 6 and FIG. 7. FIG. 5 of this patent application is a perspective, side view of a four wheeled vehicle 500 showing operation by a seated operator 502. Operator 502 is in a seated position on a support 504 of the four wheeled vehicle 500. Aft wheels 506 and 508 are shown coaxial about an axis defined as Y-axis. Each of aft wheels 506 and 508 is driven by a motor actuator (not shown) such that steering may be effectuated through differential torque applied to aft wheels 506 and 508. The four wheeled vehicle 500 has two forward wheels 510 and 512. The forward wheels 510 and 512 and the aft wheels 506 and 508 can be controlled in a sloped surface mode by moving an input mechanism 514 to move the four wheeled vehicle 500 up a sloped surface.

For example, the operator 502 could pull and push the input mechanism 514 towards and away from the operator 502, respectively, to cause the vehicle 500 to travel up a sloped surface. When operating in a sloped surface mode, pulling the input mechanism 514 towards the operator 502 results in the vehicle 500 maintaining a stationary position on the surface. Then, pushing the input mechanism 514 away from the operator 502 commands the propulsion system (i.e., the motors coupled to the wheels 506 and 508) to apply torque (e.g., additional torque than is already being supplied to maintain the position of the vehicle on a sloped surface) to the wheels 506 and 508 to cause the vehicle 500 to travel up the sloped surface.

In one embodiment, the four wheeled vehicle 500 has an additional handle (not shown, but, instead of the input mechanism 514) that is rotated in the sloped surface mode similarly as described with respect to the handle 404 of FIGS. 4A, 4B and 4C.

Figure 6:
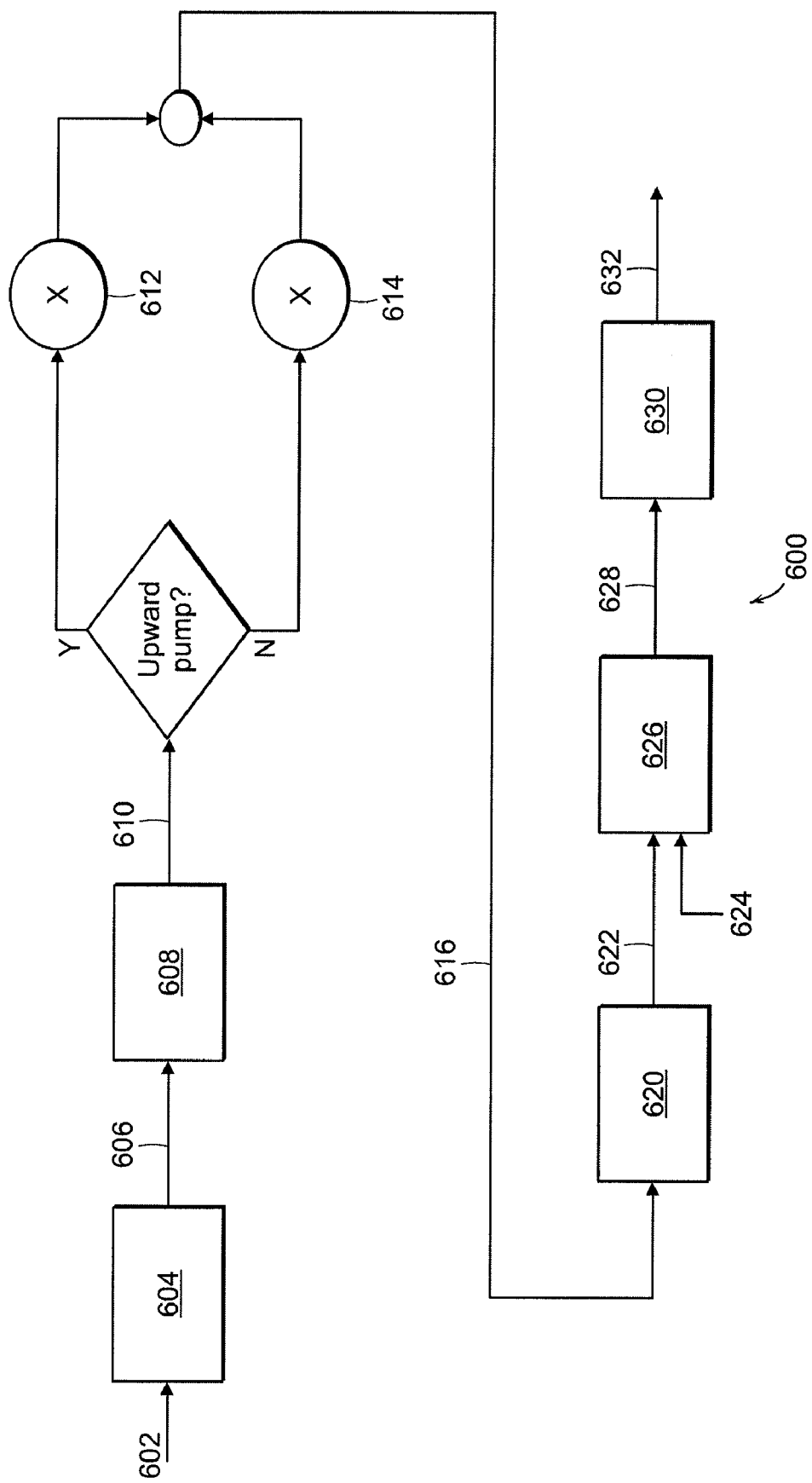
FIG. 6 is a block diagram showing a control algorithm for transporter in a sloped surface mode of operation, according to an illustrative embodiment of the invention.

FIG. 6 is a schematic block diagram of an example of a control algorithm for a sloped surface mode, according to an illustrative embodiment of the invention. A pitch rate input 602 is derived, for example, by inertial sensors, as described above in connection with FIG. 2. The pitch rate input 602 is coupled to a high pass filter 604. The high pass filter 604 compensates for errors in the pitch rate input 602 (e.g., undetected pitch rate drift.) The high pass filter 604 outputs a compensated pitch rate 606 to a deadband filter 608. The deadband filter 608 filters out noise (e.g., unwanted oscillations due to unintended movement of the input handle) from the compensated pitch rate 606 and outputs a compensated noise-free pitch rate 610. If the pitch rate input 602 occurs as a result of a downward pump, then the compensated noise free pitch rate 610 is multiplied by a zero speed gain 612 to produce a desired motor speed 616. If the pitch rate input 602 occurs as a result of an upward pump, then the compensated noise free pitch rate 610 is multiplied by a sloped surface motion speed gain 614 to produce a desired motor speed 616. The desired motor speed 616 is coupled to a speed limit calculator 620. The speed limit calculator 620 outputs a speed limited desired motor shaft speed 622 to a motor voltage calculator 626.

The motor voltage calculator 626 is coupled to a measured motor shaft speed 624. A motor shaft speed error ($V_{error}$) is calculated by the motor voltage calculator 626, EQN. 4, as follows: The motor shaft speed error can be calculated by:

$$V_{error} = |V_{desired} - V_{measured}|$$ (EQN. 4)

where $V_{desired}$ is desired motor shaft speed 622 and $V_{measured}$ is measured motor shaft speed 624. An integrated motor shaft speed error ($\int V_{error}$) is calculated by the motor voltage calculator 626, EQN. 5, as follows:

$$\int V_{error} = \int_{error} + V_{error}$$ (EQN. 5)

where $\int V_{error}$ is the integrated motor shaft speed error and $V_{error}$ is motor shaft speed error. A motor voltage command ($V_{command}$) 628 is calculated by the motor voltage calculator 626, EQN 6, as follows:

$$V_{command} = (V_{error} * K_p) + (\int V_{error} * K_I)$$ (EQN. 6)

where $K_p$ is a proportional gain and $K_I$ is an integral gain. The proportional gain and integral gain can be gain values that produce a motor voltage command 628 with a desired polarity. For example, the desired polarity to move the vehicle up a sloped surface can be positive. The motor voltage command 628 is coupled to a motor drive 630 (e.g., Motor drives 231 and 232 of FIG. 2) that provides torque to ground contacting elements (not shown). The control algorithm 600 for a sloped surface can be used, for example, with the operation of the transporter 400 of FIGS. 4A, 4B and 4C as discussed above.

In some embodiments, the sloped surface motion speed gain 614 is set by an operator. In other embodiments, the sloped surface motion speed gain 614 is determined based on an experience level of an operator. For example, a more experienced rider may desire that the transporter travel along a sloped surface quickly, while a less experienced operator can desire the transporter travel along the sloped surface slowly. Accordingly, the operator can select the value of the sloped surface motion speed gain to suit the operator's preferences.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The described embodiments of the invention are intended to be merely exemplary and numerous variations and modifications will be apparent to those skilled in the art. All such variations and modifications are intended to be within the scope of the present invention as defined in any appended claims.

The invention claimed is:

1. A method for safely moving a vehicle up or down a sloped surface, comprising:

providing a sloped surface mode of operation;

providing an amount of torque to at least one ground contacting element of the vehicle to prevent the vehicle from uncontrollably moving down the sloped surface while in the sloped surface mode of operation; and providing an assist mechanism to enable an operator to guide the vehicle;

monitoring a shaft speed of a motor drive of the vehicle;

adjusting the amount of torque provided by the motor drive to the at least one ground contacting element to prevent the vehicle from uncontrollably moving down the sloped surface;

controlling the direction of torque provided to the at least one ground contacting element;

increasing the amount of torque provided to the at least one ground contacting element to allow the vehicle to move up the sloped surface in a first sloped surface mode of operation; and decreasing the amount of torque provided to the at least one ground contacting element to allow the vehicle to move safely down the sloped surface in a second mode of operation.

2. The method of claim 1, further comprising moving the assist mechanism from a first position to a second position of the vehicle to initiate the first sloped surface mode of operation.

3. The method of claim 1, wherein the movement of the assist mechanism simulates a ratchet-type movement between the assist mechanism of the vehicle and a location that the ground contacting element contacts the sloped surface.

4. The method of claim 1, further comprising initiating the second mode of operation by a non-movement of the assist mechanism of the vehicle.

5. The method of claim 1, further comprising limiting the distance the vehicle travels while in the mode of operation.

6. The method of claim 1, further comprising controlling forward movement of the vehicle via at least one of pitch rate or pitch of the vehicle.

7. The method of claim 1, further comprising steering the vehicle via the assist mechanism of the vehicle.

* * * * *